United States Patent [19]

Jaikaran

[11] Patent Number: 5,344,100
[45] Date of Patent: Sep. 6, 1994

[54] VERTICAL LIFT AIRCRAFT

[76] Inventor: Allan Jaikaran, 136 Crest Camp, Fyzabad, Trinidad and Tobago

[21] Appl. No.: 18,101

[22] Filed: Feb. 17, 1993

[51] Int. Cl.$^5$ .............................................. B64C 39/06
[52] U.S. Cl. .................... 244/12.2; 244/23 C
[58] Field of Search ............. 244/12, 23 A, 23 B, 244/23 D, 56; 384/616, 613, 620, 585

[56] References Cited

U.S. PATENT DOCUMENTS

| | | | |
|---|---|---|---|
| 2,951,660 | 9/1960 | Giliberty | 244/23 D |
| 3,650,583 | 3/1972 | Itin et al. | 384/616 |
| 3,774,865 | 11/1973 | Pinto | 244/23 C |
| 3,997,131 | 12/1976 | Kling | 244/23 C |

FOREIGN PATENT DOCUMENTS

| | | | |
|---|---|---|---|
| 230204 | 3/1963 | Austria | 244/23 C |
| 616564 | 3/1961 | Canada | 244/23 C |

*Primary Examiner*—Galen L. Barefoot
*Attorney, Agent, or Firm*—Gunn & Kuffner

[57] ABSTRACT

A vertical lift aircraft includes a central cabin and a set of concentric, circular, counter-rotating power blade assemblies. Gas turbine engines located in the central cabin provide power for rotating the power blade assemblies to cause lift and motion of the aircraft. The turbine engine exhaust gases are directed through a rotatable exhaust nozzle for aiding in the thrust and momentum of the aircraft. The gas turbine engines drive electric power generators which provide the necessary power for operation of the aircraft.

6 Claims, 5 Drawing Sheets

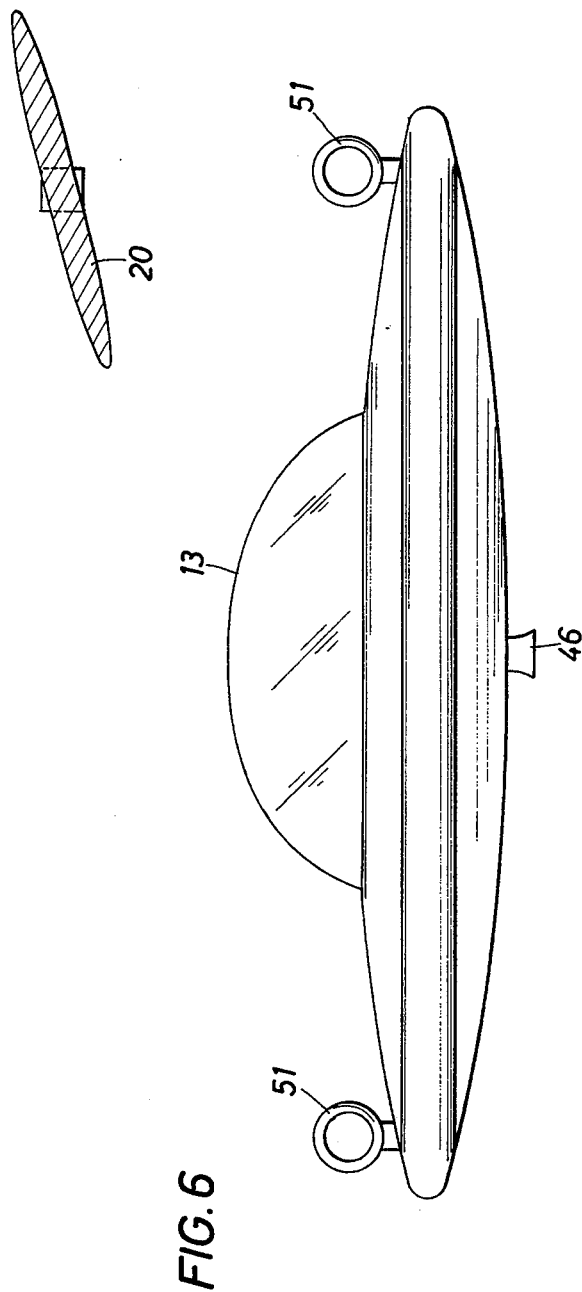
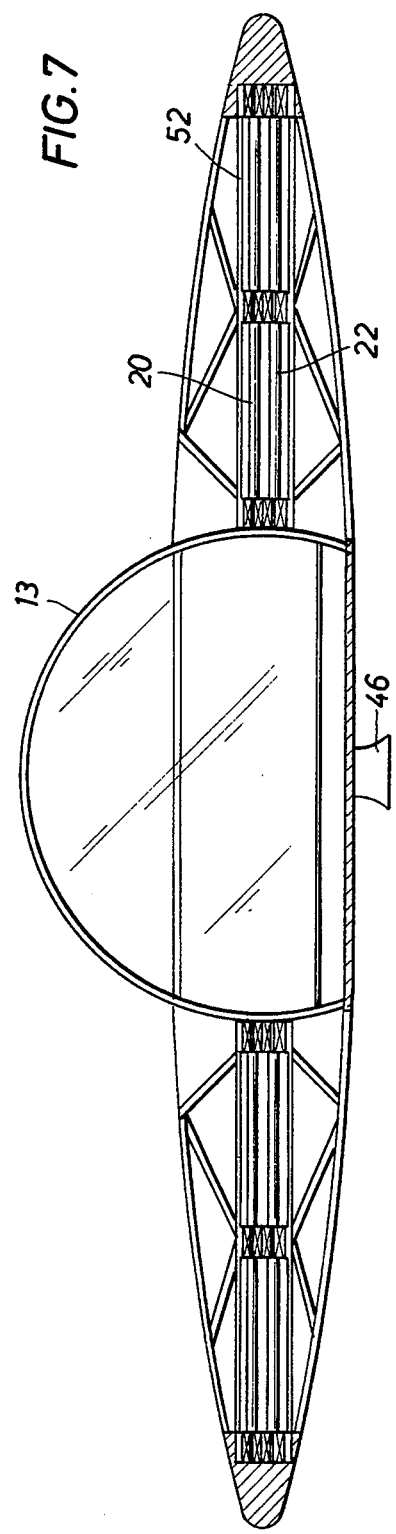

VERTICAL LIFT AIRCRAFT

BACKGROUND OF THE DISCLOSURE

This application is directed to vertical take-off and landing aircraft designed to replace motor vehicles as the basic method of passenger transportation. More particularly, this application relates to a vertical take-off and landing aircraft having a circular body and a shape which, in cross section, is substantially equivalent to one or more air foils.

Because of their design, helicopters are inherently limited in the number of blades which the rotating mechanism can carry. As the rotation of each blade increases from rest, a pressure differential is created between upper and lower surfaces of the blade whereby lift is achieved. These generally horizontal rotating blades are referred to as the power blades. The most efficient area of power blades during lift is that area adjacent to the outer periphery or tip of the blades. The amount of lift generated by the rotating blade is essentially proportional to the area of the blade per unit length of the distance the blade travels. This proportionality changes from the tip of the blade to the axis of rotation, at which point the lift per unit area is almost nil. The lift created by a rotating helicopter blade is proportional to the inclination of the blade or angle of attack of the blade in relation to the air. The relationship of lift per unit length is proportional to the distance from the axis of rotation at whatever angle of attack the blades are set.

The force of the rotating blades needed to lift the helicopter also produces an undesirable gyroscopic effect. Without some means of correction, the gyroscopic effect of the blades would spin the body of the helicopter out of control. In helicopters, the gyroscopic effect caused by rotation of the power blades is typically canceled (i.e., balanced) by the use of a tail rotor.

SUMMARY OF THE INVENTION

In the present invention, unlike in a helicopter, the power blades are of a uniform cross section, generally in the shape of an air foil. In this way, the aircraft of the present invention utilizes the maximum benefit of lift from the outer extremity of each blade, where the lift per unit length of blade is greatest.

In the aircraft of the present invention, there is a plurality of power blades, affixed in such a way that each has a fixed angle of attack with the air. These blades are each rigidly affixed between two circular blade holders which rotate on circumferential bearings at the top and at the bottom. Because the blades are supported at both ends they experience much lower stress loads than that of a typical helicopter blade.

The aircraft of the present invention, will include a central cabin and a set of concentric, circular, counter-rotating power blade assemblies. It will also include twin gas turbine engines located in the central cabin, each adequate to provide power to cause rotation of the power blade assemblies and consequently to cause lift and motion. The high volume and high pressure exhaust gases generated by the gas turbine engine are directed through a mechanism capable of rotating through 180 degrees. This mechanism permits the aircraft to travel forward, in a reverse direction or to hover. The exhaust gases, via a turbo-expander, aid the aircraft to move in all directions and to hover. The turbo-expander is used to convert high velocity energy of the exhaust gases to low velocity, high pressure exhaust gases. This aids in thrust and momentum of the aircraft. The gas turbine engines drive electric power generators which provide all the necessary power for the utilities required and which also drive two independently operated electric motors. The electric motors drive the two power blade assemblies. The operation of the two electric motors are computer controlled to adjust to and to provide positive and negative gyroscopic effects that may be required to maintain aircraft stability from external weather conditions or from internal transference of weights or movement of people. The electric power provided is used to drive the on board computer, to provide air conditioning and to provide lights in accordance with the aircraft's requirement, including search lights for nighttime use of the aircraft. The aircraft will also be fitted with radar for safety and a global positioning system (GPS) for determining aircraft position anywhere on the world by using satellite positioning.

The power blade assemblies of the invention each consist of a plurality of rotor blades disposed circumferentially and extending generally radially outward from the center of the disc-shaped body. The rotor blades are of a uniform cross section, substantially that of an air foil in order to reduce drag. Furthermore, the blades are oriented at an angle which is fixed in relation to the flow of air through the assemblies and to the direction of rotation of each assembly such that the air flows in a single direction, thereby maximizing vertical lift. Since the blades are supported at both ends and have the same fixed angle of attack to the air, stresses caused by deflection and other such stresses, will be much lower than on a typical helicopter blade. As a consequence, aircraft control will be easier to achieve.

The power blade assemblies are secured between two circular rotating bands, a first band which is generally disposed around the periphery of the disc-shaped body, and a second band, which is generally disposed inward of the periphery and surrounding the aircraft cabin. The blades in each power blade assembly are substantially of the same physical size, shape and weight, and there are the same number of blades in each assembly. The assemblies are oriented one above the other and caused to rotate counter to each other. Because the two assemblies will have equal mass, circumference and drag, the counter rotation of the second assembly creates a gyroscopic effect which cancels the gyroscopic effect of the first assembly.

It may be desirable to protect the blade assemblies from external objects by means of a mesh screen, or the like, which is installed over the area of the blades.

It is important that all static and dynamic forces, which tend to cause the rotating blade assemblies to be out of balance, be removed before installation. It is also important that the bearing pressures on the two sets of power blade assemblies be the same. To accomplish this, it is preferred to have adjustable clamps installed on structural flaming surrounding each set of blade assemblies in association with means to control such adjustment.

DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 5 is an illustration of a cross section of a single rotor blade;

FIG. 6 is an illustration of an additional embodiment of the invention, wherein the aircraft is fitted with small gas turbines to provide additional forward thrust;

FIG. 7 illustrates an embodiment of an aircraft of the invention showing an additional set of power assemblies located concentrically to the first set in order to provide additional lifting power;

DETAILED DESCRIPTION OF THE PREFERRED EMBODIMENT

With particular reference to the embodiments illustrated in the attached drawings, the details of the invention will be more readily discernible. It will be observed that the embodiments of the invention set forth are intended to contain all necessary elements for the device to climb, hover and fly.

Figure 1:
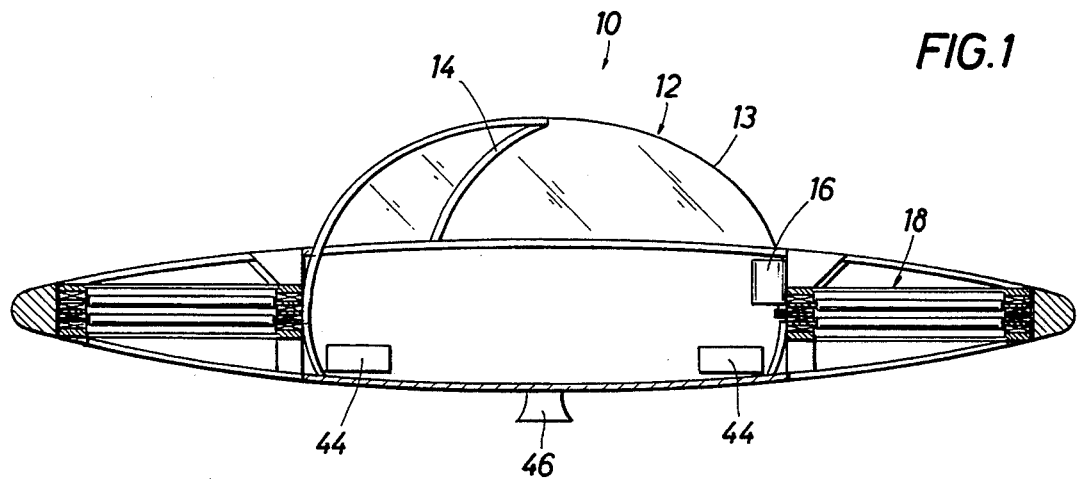
FIG. 1 shows a side view of an aircraft embodying the invention of this application, with the power blade assembly and its support shown in vertical cross section.
Figure 2:
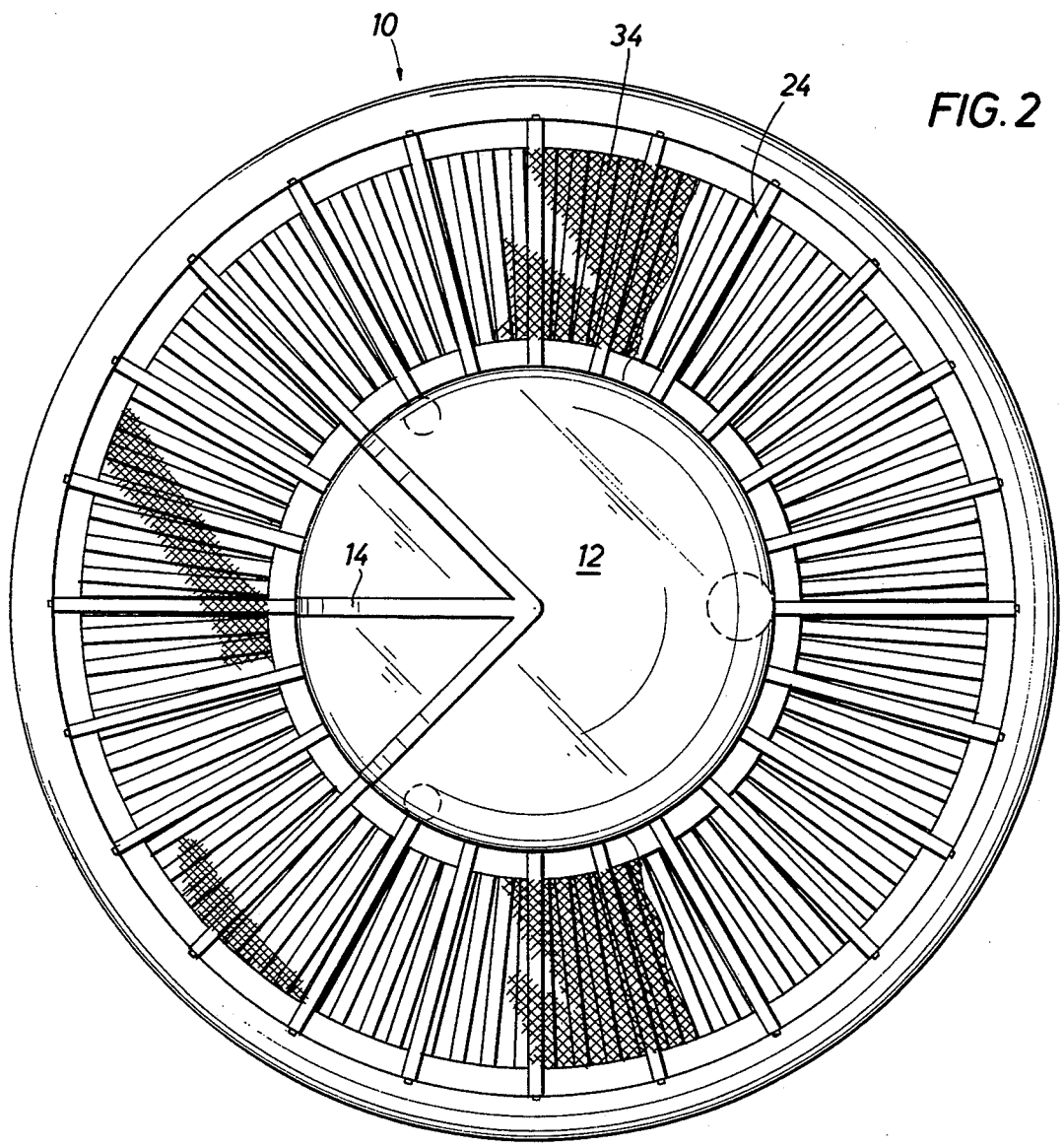
FIG. 2 illustrates a plan view of the aircraft of the invention with portions of the protective mesh removed and structural frame numbers shown.

With reference first to FIGS. 1 and 2, it will be seen first that the profile of the vehicle of the invention, generally identified by the reference numeral 10, has an aerodynamic shape and thus, in and of itself, is intended to be capable of generating lift. The vehicle 10 will be seen to be generally in the shape of a disc. The cross section, shown partially in FIG. 1, is generally in the shape of an aero-foil. The aircraft control mechanisms, power supply and passenger unit will be primarily located in cabin generally identified by the reference number 12, the upper half of which is shown in the drawing as a dome shaped portion 13, which is supported by structural frame members 14. The cabin 12 of the aircraft 10 may also contain two or more electric motors 16 for providing an electric power source used to drive the power blades of the counter-rotating turbine assemblies.

Directly surrounding the central cabin 12 and generally disposed around the periphery thereof are two sets of counter-rotating turbine blade assemblies 18 positioned one above the other. The turbine blade assemblies 18 comprise two sets of power blades 20 and 22 assembled so as to rotate in opposite directions. In the drawings, twenty sets of structural frame members 24 are shown above the top set of power blades 20 and twenty sets of structural frame members 24 below the lower set of power blades 22. It will be appreciated that the number and size of the structural frame members 24 will depend upon the diameter of the aircraft 10 requiring support and the deflection, if any, on the circumferential bearings which will be described.

Figure 3:
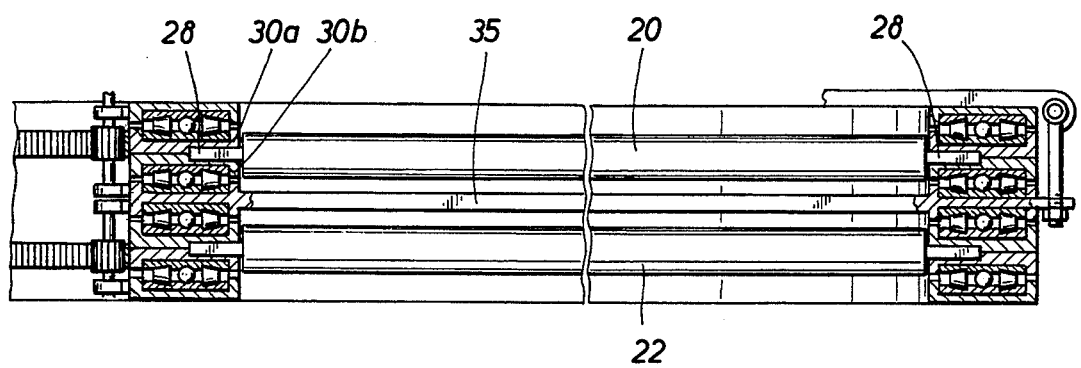
FIG. 3 is an illustration in greater detail of the cross section shown in FIG. 1, with attention directed to the roller bearings and support structure of the rotating bands which support the power blade assemblies, including the outer clamp and bearing pressure adjuster.

In the power blade assemblies 18, as best shown in FIG. 3, there is a plurality of blades 20 and 22 mounted on a shaft 28 which, in turn, is supported between two sets of movable rotatable bands 30a and 30b.

Figure 4:
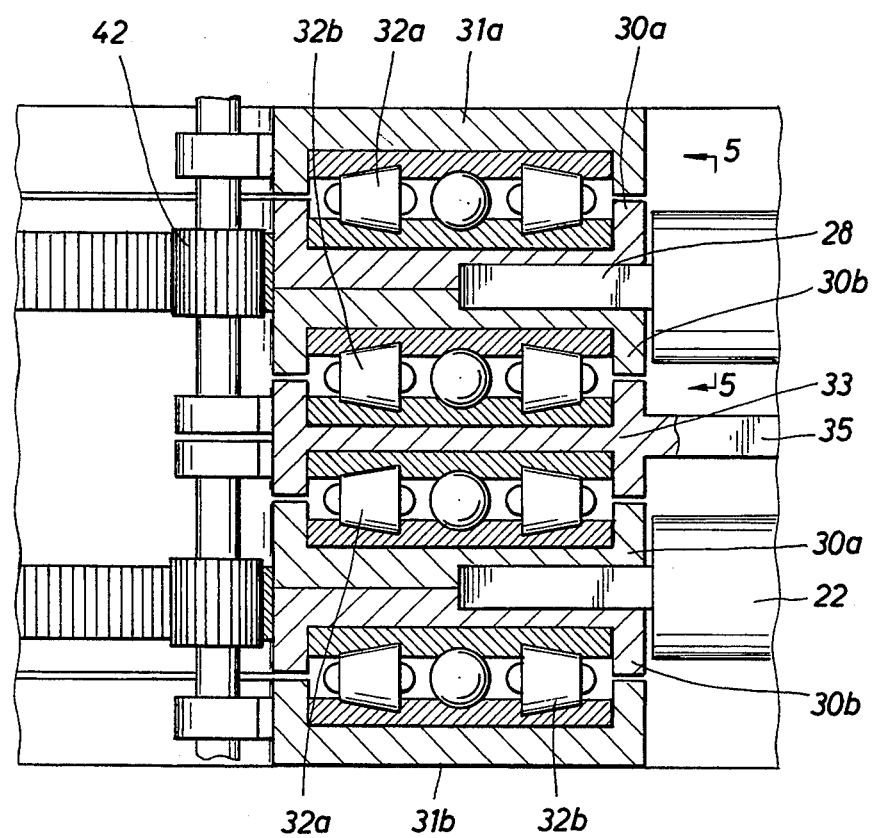
FIG. 4 is an additional view of the support structure illustrated in FIG. 3, with additional detail directed to the drive mechanism.

The detail of the power blade assemblies is more particularly shown in FIGS. 3 and 4 of the drawings. As shown therein, the power blades 20 and 22 are rigidly affixed between the two circular bands 30a and 30b which rotate on circumferential bearings 32a and 32b above and below the rotatable bands. The circumferential bearings allow the bands 30a and 30b with the power blades 20 and 22 affixed thereon to rotate on the periphery or circumference of the aircraft 10. In all instances it is recommended that the angle of attack at which the blades 20 and 22 are fixed remains the same so that the air generated by the rotating turbine blades 20 and 22 is in a single direction.

In each of FIG. 3 and FIG. 4, it will be seen that the second set of blade assemblies 18 is of the same physical size, weight and shape, with the same number of power blades 22, and placed below the first set of power blades 20. The blades are oriented in each set of power blades 20 and 22 in such a way that the angle of attack is the same. This requires that the blades 20 and 22 to be placed in opposite directions with respect to the positive x-axis. This is so that the rotation of the circular bands 30a and 30b is opposite and the gyroscopic effect of each set of power blades 20 and 22 is canceled out.

In reference to FIG. 2, there is shown portions of a wire mesh covering 34 that is placed over the top of the rotating blade assemblies in order to protect the blades 20 and 22 from external objects.

In order to assure that the compressive pressures on the two sets of bearings 32a and 32b are essentially the same, adjustable clamps 40 are installed on each set of structural framing about the blade assemblies 18. Disposed in positions balanced in relationship to the motors 16, and around the periphery of the blade assemblies 18, there are located idle gears 42 which are needed to keep the blade assemblies in place during rotation.

It is important that all static and dynamic forces be balanced and/or offset in the operation of the counter-rotating sets of blade assemblies. It is particularly important that the compressive pressures on the roller bearings 32a and 32b on which the blade supporting bands 30a and 30b rotate be controllably adjustable. A detail of a preferred adjustable clamp 40 is presented in the drawings, FIGS. 3 and 8.

The structural framing includes a circular rib, similar to a flat ring 31a and 31b. Both the number of structural frames and the circular ribs 31a and 31b used are such that the outer set of bearings 32a and 32b (the circumferential or peripheral set of bearings) have a constant bearing pressure. The structural framing is fabricated out of high strength low weight materials to provide adequate strength for support and containment of the bearings as well as to reduce the weight of the present invention. A central stationary, circular band 33 provides support for and a bearing surface for the innermost set of bearings 32a and 32b. Additional stability is provided by a set of centre tie members 35 extending between the inner and circumferential bearing assemblies 18. The centre tie member 35 are welded integrally formed with, or otherwise fixed to the stationary circular band 33.

Figure 8:
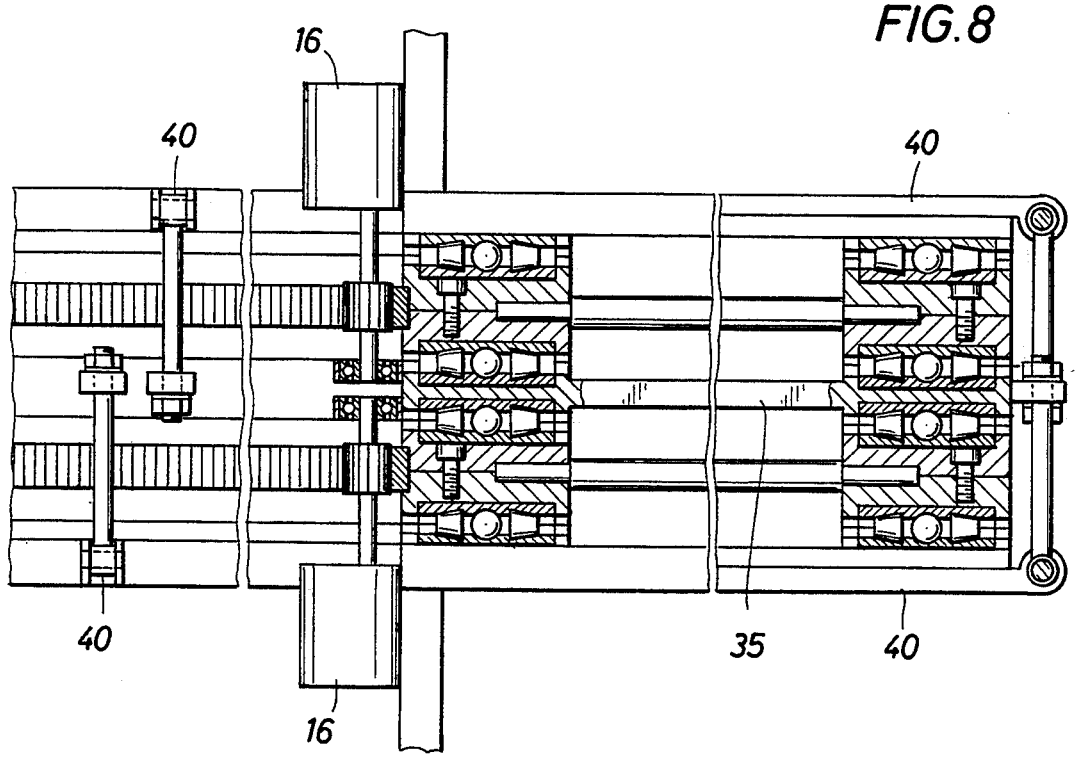
FIG. 8 is a partially broken away view of the invention with attention directed to details of the drive mechanism of the invention.
Figure 9:
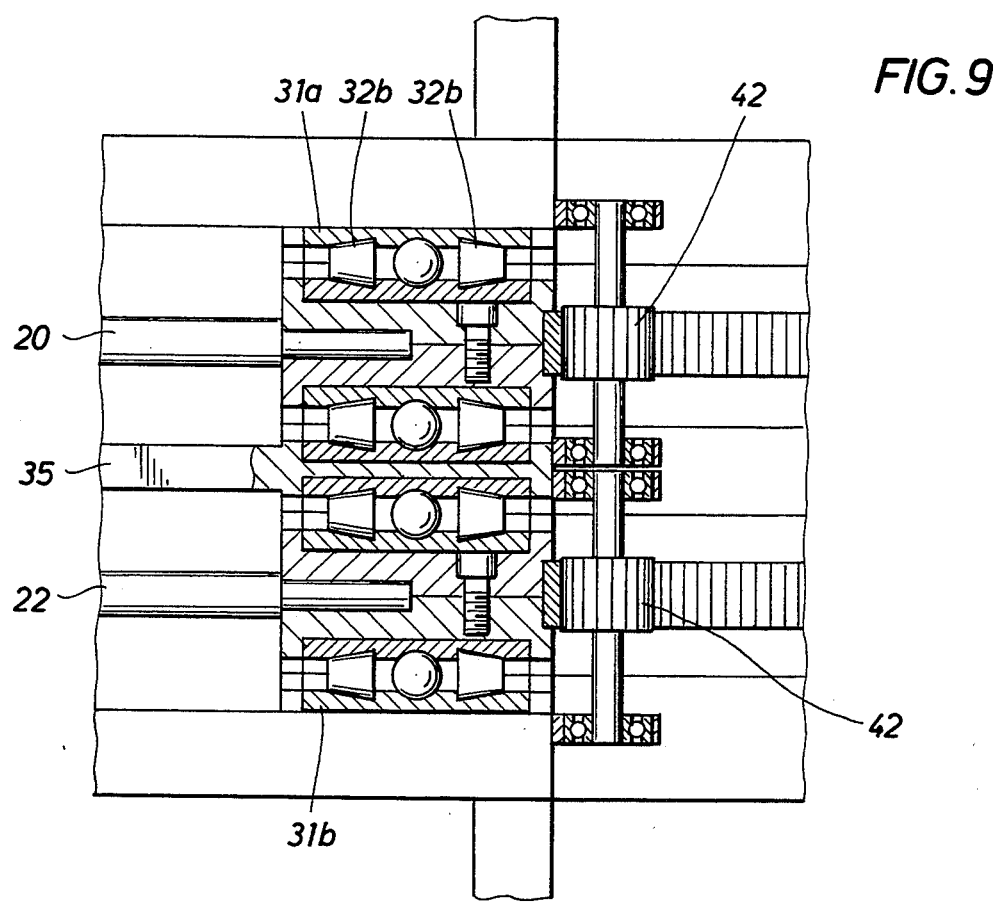
FIG. 9 is a partially broken away view of the invention with attention directed to details of the idle gears on the drive mechanism of the invention.

Lift off of the aircraft 10 of the present invention is achieved by rotating the two sets of turbine blades 20 and 22. The blades are powered by individually controlled electrical motors 16 affixed to each set of power blade assemblies 18. The motors 16 are adequately sized and powered to accomplish the necessary lift. Power to the motors 16 is provided from two generators affixed to two gas turbine engines 44, each of which is adequate to power the aircraft. The generators are adequately sized and powered to supply power to the individual motors 16 and additional power for the auxiliary devices such as lighting (both interior and external for night travel), air conditioning, cabin pressurization and computer and control facilities. It is preferred to provide an individual power drive for each blade assembly 18, as best shown in FIG. 8, so as to use normal gyroscopic effect for turning the aircraft through the adjustment of the speed of one set of power blades in relation to the other set of power blades while in flight.

Idle gears 42 or others means are necessary to hold each assembly in place as it rotates. At least three points of contact, spaced evenly, are preferred to prevent the blade assemblies 18 from shifting from side to side. All blade assemblies 18, whether side by side or one above the other, must be held stationary in this fashion.

The aircraft presented in this application utilizes exhaust gases from the power sources to provide proper flight attitude by lifting the rear of the aircraft 10 in relation to the front, so that the power blades are able not only to provide lift, but also to provide forward speed. It is contemplated that the fuel supply, engine and power transfer mechanism, control mechanisms, seating and storage facilities are all suitably located in the cabin. The high volume and high pressure exhaust gases of the gas turbine is directed through an exhaust nozzle 46 capable of rotating through 180 degrees and via a turbo-expander to cause a change in aircraft attitude for providing forward motion, the ability to hover by rotating the exhaust nozzle 46 by 90 degrees or to go in a reverse direction by first going through the hovering sequence and then rotating the exhaust nozzle 46 through a total of 180 degrees from the horizontal, i.e., from forward motion, to stop and to reverse motion. The turbo-expander (not shown in the drawings) is used to convert high velocity energy of the exhaust gases to low velocity, high pressure exhaust gases. This aids in thrust and momentum of the aircraft 10.

Figure 10:
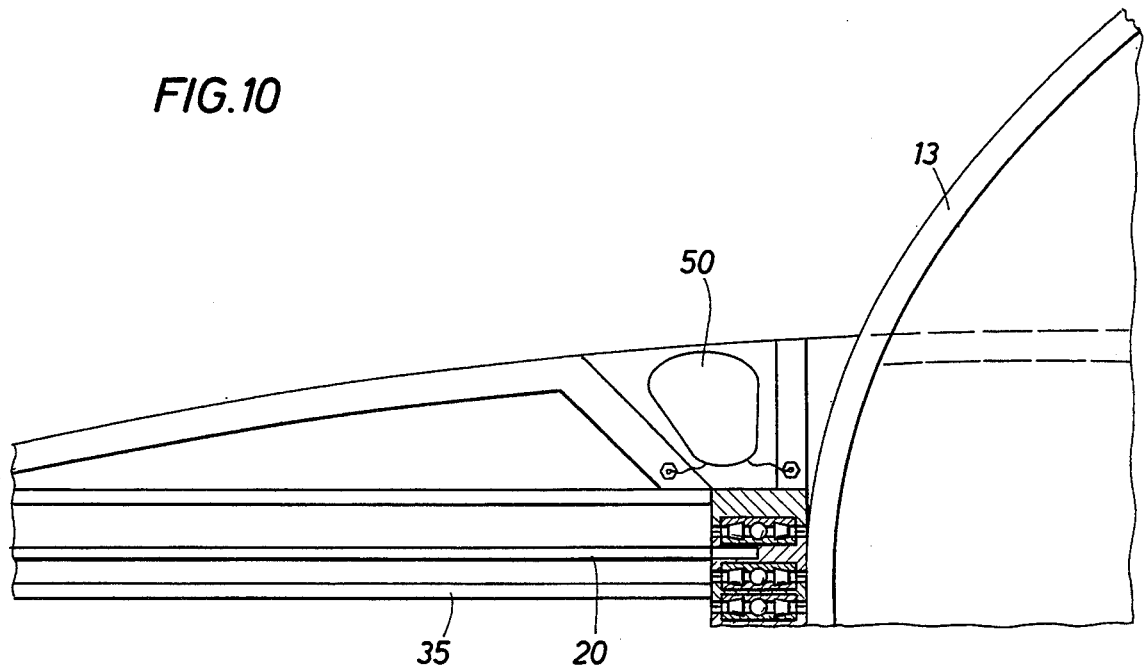
FIG. 10 is a partially broken away view of the aircraft of the invention illustrating an embodiment of the invention including a parachute release assembly.

Additional safety features, including a releasable parachute assembly 50, may be provided preferably above the support framing for the internal rotating bands 30a and 30b, as illustrated in FIG. 10. By the very nature of the design of the bottom of the aircraft 10, if the engine fails, the aircraft would slow down and start to fall, but would not fall precipitously. When parachutes are added, the slow downward drift of the aircraft 10 would be facilitated even more. At least four parachutes assemblies 50 substantially equally positioned about the periphery of the cabin 12 are preferred to provide a stabilized downward drift of the aircraft 10.

The present design of the aircraft 10 also provides added protection in the form of flotation cells, placed around the base of the aircraft, preferably underneath the internal rotating bands 30a and 30b. These cells would prevent the aircraft 10 from sinking should it stall and fall into water.

For additional speed, the aircraft 10 may be fitted with small gas turbines 51 on small air foils located on the periphery of the aircraft 10 to provide additional forward thrust, should this be required. The small gas turbines 51 mounted on small air foils must be mounted so as to allow the gas turbines to be rotated through a few degrees to the vertical to ensure that the forward thrust is maintained through the changes in attitude of the aircraft 10 while in flight. The air foils provide additional stability to the aircraft 10. The stability of the aircraft 10 may be increased even further by using small rudders and/or flaps on the air foils.

Figure 11:
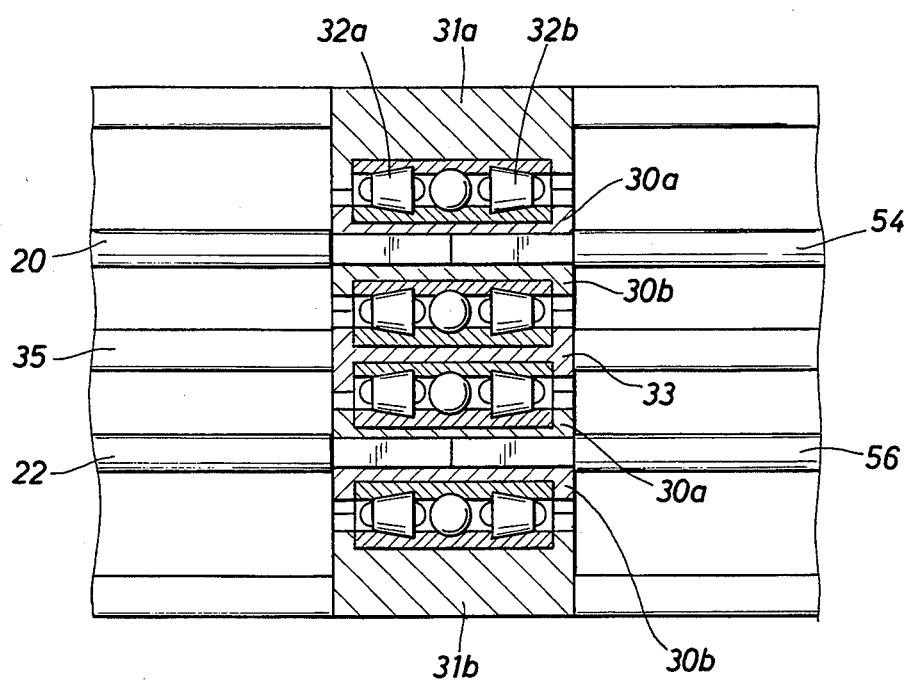
FIG. 11 is a partially broken away view of the invention with attention directed to details of the roller bearing and support structure between the inner and outer power blade assemblies.

In the instance where additional lifting power is required, a second set of counter-rotating blade assemblies 52 may be fitted on both the upper and lower set of blade assemblies 18, as shown in FIG. 7. The outer set of power blades 54 and 56 are powered by the inner set of power blades 20 and 22 via the central circular blade bands 30a and 30b. The inner and outer set of power blades are connected end to end, as best shown in FIG. 11.

The instant invention has been shown and described herein in what is considered to be the most practical and preferred embodiment. It is recognized, however, that departures may be made therefrom within the scope of the invention contemplated. Those skilled in this art will recognize that obvious modifications may be made to the specific embodiment described without departing from the spirit and scope of this disclosure.

WHAT IS CLAIMED:

1. An aircraft capable of vertical take-off and landing comprising:
   (a) a substantially disc-shaped body having a cross-section generally in the shape of an airfoil;
   (b) a central cabin located in the center of the body;
   (c) a pair of concentric, circular power blade assemblies disposed within said body, wherein the power blade assemblies are positioned one above the other, and wherein each power blade assembly comprises;
      (i) a first circular band generally disposed around the periphery of the disc-shaped body and a second circular band generally disposed inward of the periphery and surrounding the central cabin;
      (ii) a plurality of rotor blades extending generally radially outward from the center of the disc-shaped body and fixedly secured between the first and second bands, wherein the rotor blades are oriented at a fixed angle in relation to the flow of air through the power blade assembly and to the direction of rotation of the power blade assembly such that the air flows in a single direction;
      (iii) a plurality of roller bearings securely positioned above and below each circular band; and (iv) controllable means to adjust the bearing pressure compressing each set of bearings; and (d) means located in said cabin to cause the pair of power blade assemblies to rotate in opposite directions.

2. The airshaft of claim 1 wherein the means for rotating said bands comprises individually controlled electric motors operatively connected to said power blade assemblies.

3. The aircraft of claim 1 wherein said controllable means for adjusting the bearing pressure for each set of bearings comprises a circumferentially mounted adjustable clamp.

4. The aircraft of claim 1 including gas exhaust means for changing the flight attitude of the aircraft by expelling the exhaust gases through a rotatable exhaust nozzle, wherein said exhaust nozzle is rotatable through 180 degrees enabling the aircraft to move forward, stop, and to reverse direction.

5. The aircraft of claim 1 including at least one releasable parachute assembly mounted on said disc-shaped body of the aircraft.

6. The aircraft of claim 1 including gas turbine means located on the periphery of said disc-shaped body for providing additional forward thrust and stability to the aircraft.

* * * * *